United States Patent Office 3,790,491
Patented Feb. 5, 1974

3,790,491
SPINNING SOLUTION COMPRISING A POLY-
AMIDE, POLYESTER OR POLYOLEFIN AND
AN OPTICAL BRIGHTENER
Gaudenz Girell di Giovanoel, Arlesheim, Basel-Land, and
Reinhard Zweidler, Basel, Switzerland, assignors to
Ciba-Geigy Corporation, Ardsley, N.Y.
No Drawing. Original application Nov. 19, 1969, Ser. No.
878,214, now Patent No. 3,635,959. Divided and this
application July 22, 1971, Ser. No. 165,381
Int. Cl. D06l 3/12
U.S. Cl. 252—301.2 W       1 Claim

ABSTRACT OF THE DISCLOSURE 2-4-(3-alkyl - 4 - phenyl-v-triazole) - styryl benzoxazoles and -benzothiazoles are brighteners for organic material. The compounds are obtained from the oxims of the coupling products of p-diazo-2-styrylbenzoxazoles and benzylalkylketones through splitting off water.

DESCRIPTION OF THE INVENTION

The present invention relates to new optical brighteners, the use of these brighteners for the brightening of organic material as well as the organic material brightened with the aid of the new optical brighteners.

This application is a division of application Ser. No. 878,214, now U.S. Pat. 3,635,959 issued Jan. 18, 1972.

V- triazolyl-styryl-benzoxazoles, substituted in the 4,5-position of the v-triazole ring by an aromatic radical, have already been suggested as optical brighteners. Incorporated in nylon melts, these known brighteners have an unsatisfactory fastness to light.

New compounds of this class have now been found which produce excellent brightening effects, which are versatile in application, which do not have the stated disadvantage and which, moreover, on a series of fibres, are capable of producing a higher degree of whitening than the above mentioned brighteners. The new compounds correspond to the Formula I:

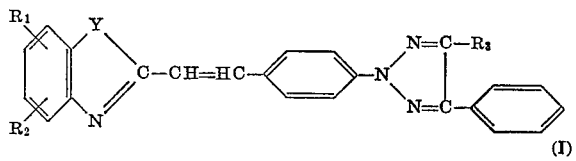

(I)

wherein

Y represents oxygen or sulfur, and $R_1$ represents hydrogen, an alkyl group having from 1 to 4 carbon atoms, the phenyl group, a phenyl group substituted by alkyl having 1 to 4 carbon atoms, an alkoxy group having 1 to 2 carbon atoms or chlorine, an alkoxy group having 1 to 2 carbon atoms, an alkyl-sulfonyl group having 1 or 2 carbon atoms or chlorine, $R_2$ represents hydrogen or an alkyl group having from 1 to 4 carbon atoms, and $R^3$ represents an alkyl group having 1 to 4 carbon atoms.

Particularly valuable are the compounds wherein $R_1$ represents hydrogen, the methyl group, the phenyl group, the methylsulfonyl group, or chlorine, and $R_2$ represents hydrogen or the methyl group and $R_3$ represents the methyl group.

The brighteners are produced, according to the invention by condensing an oxime of the Formula II:

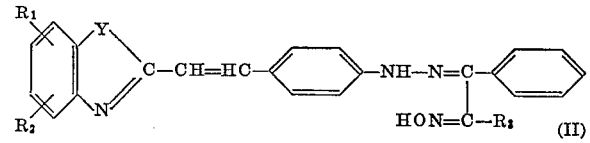

(II)

with agents splitting off water, to give the triazole of the Formula I.

Suitable agents splitting off water are the known acid condensation agents, e.g. phosphorus oxytrichloride, phosphoric acid or boric acid, zinc chloride or zinc bromide, acetic acid anhydride or an organic acid, such as p-toluenesulphonic acid.

A further production process is characterized by oxidatively converting an oxime of the Formula II into the corresponding v-triazole oxide and subsequently converting this with nascent hydrogen into a compound of the Formula I.

For the oxidation, it is advantageous to use a copper-II-salt such as copper sulphate, and pyridine as solvent, whereby the refluxing method is used. The nascent hydrogen can be produced by zinc dust and acid, e.g. glacial acetic acid.

The oxime of the Formula II, used as starting material, can be obtained in a known manner by condensing, e.g. molar amounts of a 2-methylbenzoxazole with a p-nitrobenzaldehyde to the corresponding 2-styrylbenzoxazole, diazotizing this, after reduction of the nitro group to the amino group, and coupling the product with a ketone of the formula $C_6H_5$—$CH_2$—$CO$—$R_3$. From the azo compound is then produced with hydroxylamine, the oxime used as starting material for the process according to the invention.

The brighteners of the Formula I, according to the invention, are colourless to yellowish, crystalline substances. Dissolved in organic solvents, they exhibit an intensive blue to violet fluorescence. They impart in daylight to yellowed organic material a white appearance, when the brighteners are incorporated in the material in small amounts which can vary within wide limits, e.g. from 0.001 to 0.5%, or when applied to the material. The compounds, according to the invention, thus produce good white effects on cellulose and polyamide materials such as cotton, viscose silk, rayon staple and synthetic polyamides based on caprolactam or nylon, whereby the synthetic polyamides can not only be brightened from an acid or neutral aqueous bath, but also in the spinning solution. In particular, the compounds are suitable for the optical brightening of high-molecular organic material, such as synthetic organic polyplasts, i.e. plastics obtainable by polymerisation, polycondensation or poly-addition, e.g. polyethylene, polypropylene and other polyolefins, polyvinyl chloride, especially polyesters of aromatic carboxylic acids with polyvalent alcohols such as polyterephthalic acid glycol esters, synthetic polyamides such as nylon-6 and nylon-66, but also for the optical brightening of cellulose esters such as cellulose acetates.

The temperatures are given in degrees centigrade in the following examples.

EXAMPLE 1

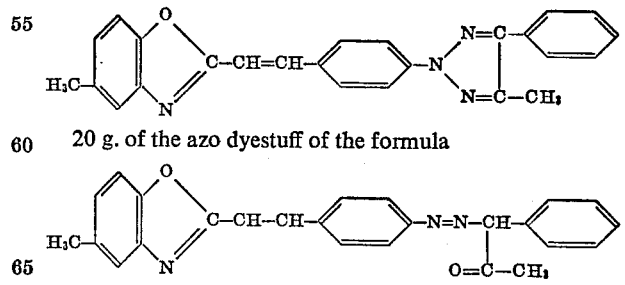

20 g. of the azo dyestuff of the formula are heated in 250 ml. of glycol monomethyl ether, after addition of 10 g. of hydroxylamine hydrochloride, 17.5 g. of sodium acetate and 20 ml. of water, during 80 minutes to 90°. The obtained oxime is refluxed with 400 ml. of acetic acid anhydride for 35 minutes. After cooling, the crude product, which has crystallized out, is filtered off and recrystallized from ligroin. The melting point of the thus obtained 2-[4-(3-methyl-4-phenyl-v-triazolyl)-styryl]-5-methylbenzoxazole is 199–200°. In organic solvents, the compound exhibits in daylight a strong violet fluorescence. The substance is suitable as optical brightener for nylon, "Dacron," acetate silk and cotton. The brightener can be applied from an aqueous dispersion or in the spinning solution. Contents of 0.001 to 0.5% impart to the treated material a beautiful white effect.

The starting material is produced as follows:

2,5-dimethylbenzoxazole is condensed with p-nitro-benzaldehyde in the presence of dimethylformamide and p-toluenesulphonic acid to the 4-nitro-styrylbenzoxazole compound. This is reduced with catalytically activated hydrogen to the amine. 300 ml. of water and 66 ml. of hydrochloric acid are added to 25 g. of the 2-(4-aminostyryl)-5-methylbenzoxazole. The orange-colored suspension is subsequently cooled to 0–5°. Diazotization is performed within half an hour at this temperature with 18 ml. of 33% nitrite solution. After the addition of the nitrite solution is completed, the mixture is stirred for one hour. The excess nitrous acid is then decomposed with sulphamic acid and the diazonium solution filtered. 21.0 g. of benzylmethyl ketone, 400 ml. of pure pyridine, 300 ml. of glacial acetic acid and 72 g. of sodium acetate are placed into a 1.5 litre stirrer-flask and cooled to 5–10°. The prepared diazo solution is added dropwise, in portions over 5 hours, whereby a pH-value of 5–5.5 is maintained. The coupling reaction is completed over a period of 15 hours, the brownish green product is filtered with suction and dried. The crude product is purified by recrystallizing it from ligroin/chlorobenzene 2:1.

If in this example, the starting material is replaced by the equivalent amount of an azo-dyestuff containing a 5-phenylbenzoxazole-(2) group, a 5,6-dimethyl-benzoxazole-(2) group, or a 5-chloro-benzoxazole-(2) group, then the compounds of the following formulae are obtained:

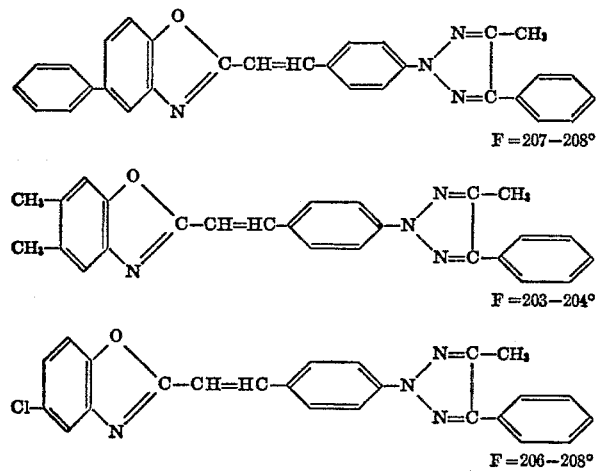

EXAMPLE 2

An aqueous solution of 10 g. of copper sulphate pentahydrate is added dropwise within one hour at reflux temperature to a solution of 9.2 g. of an oxime of the formula

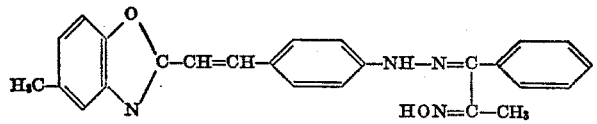

in 200 ml. of pyridine. The reaction mixture is then refluxed for a further hour, cooled and the precipitated crystal substance filtered off. The crystalline precipitate is washed in small portions with hot water and methanol and recrystallized from chlorobenzene. The thus obtained v-triazole oxide of the formula

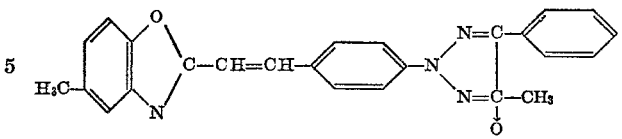

melts at 196–197°.

4.6 g. of this oxide are refluxed with 5.0 g. of zinc dust in 250 ml. of glacial acetic acid for 2 hours. The reaction mixture is then filtered hot. From the filtrate is obtained by cooling, the crude v-triazole derivative which is purified by recrystallization from chlorobenzene. The compound is identical to the final product of the Example 1.

The oxime, used as starting material, is obtained in the same manner as described in Example 1.

EXAMPLE 3

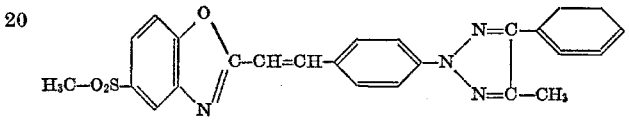

20 g. of the azo dyestuff of the formula

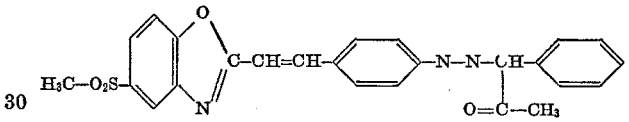

are heated in 250 ml. of glycol monomethyl ether, after addition of 10 g. of hydroxylamine hydrochloride, 17.5 g. of sodium acetate and 20 ml. of water, during 80 minutes to 90°. The obtained oxime is refluxed with 400 ml. of acetic acid anhydride for 35 minutes. After cooling, the crude product, which has crystallized out, is filtered off and recrystallized from ligroin. The melting point of the thus obtained 2-[4-(3-methyl-4-phenyl-v-triazolyl)-styryl]-5-methylsulphonylbenzoxazole is 227–228°. In organic solvents, the compound exhibits in daylight a strong violet fluorescence and is suitable for the optical brightening of nylon, "Dacron," acetate silk and cotton. The brightener can be applied from an aqueous suspension or in the spinning solution. Contents of 0.001 to 0.5% impart to the treated material a beautiful white effect.

The starting material is obtained in an analogous manner to that described in Example 1, whereby 2-methyl-5-methylsulphonylbenzoxazole is used instead of 2,5-dimethylbenzoxazole.

EXAMPLE 4

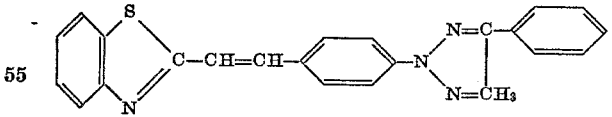

6 g. of the oxime, produced as described below, of the formula

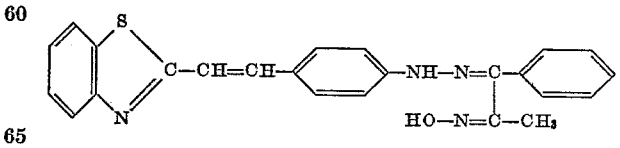

are refluxed in 200 ml. of acetic acid anhydride and 50 ml. of pyridine for 1 hour. The solution is thereupon cooled and filtered with suction. The obtained crude product is purified by recrystallization from ligroin. The 2-[4-(3-methyl-4-phenyl-v-triazolyl)-styryl]-benzothiazole is a yellowish crystalline powder, M.P. 196–200°. It exhibits in daylight a strong violet fluorescence and is suitable as optical brightener for nylon and "Dacron," whereby it can be added to the spinning solution or applied to textile material from an aqueous suspension. Contents of 0.001 to 0.5%, e.g. 0.5%, impart to the treated material a beautiful white effect.

The oxime, used as starting material, is produced as follows:

2-methylbenzothiazole is condensed with p-nitro-benzaldehyde in the presence of dimethylformamide and p-toluenesulphonic acid to p-nitro-styryl-benzothiazole. This is reduced with catalytically activated hydrogen to the amine. To 25 g. of the 2 - (4 - amino-styryl)-benzothiazole are added 300 ml. of water and 66 ml. of hydrochloric acid. The obtained suspension is cooled to 0–5° and diazotised at this temperature, within half an hour, with 18 ml. of 33% nitrite solution. After the addition is completed, the surplus nitrous acid is decomposed with sulphamic acid and the diazonium solution filtered. Into a 1.5-litre stirrer-flask are then placed 21.0 g. of benzyl-methyl ketone, 400 ml. of pure pyridine, 300 ml. of glacial acetic acid and 72 g. of sodium acetate and the whole is cooled to 5–10°. The prepared diazole solution is added dropwise, in portions, within 5 hours, whilst maintaining a pH-value of 5–5.5. The coupling reaction is completed during 15 hours, the product is filtered with suction and then dried. The crude product is purified by recrystallising it from ligroin/chlorobenzene 2:1.

EXAMPLE 5

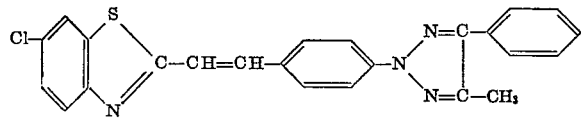

2.5 g. of crude oxime of the formula

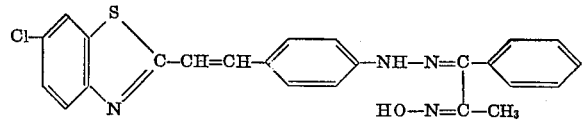

are refluxed in 100 ml. of acetic acid anhydride for 14 hours. The mixture is subsequently concentrated by evaporation to dryness and the crude product recrystallized from ligroin. The obtained 2 - [4 - (3 - methyl-4-phenyl-v-triazolyl)-styryl]-5-chlorobenzothiazole has a melting point of 130–133° and exhibits in daylight a strong violet fluorescence. It is suitable as optical brightener for nylon and "Dacron," whereby it can be added to the spinning solution or it can be applied to the textile material from an aqueous suspension. Contents of 0.001 to 0.5% impart to the treated material a beautiful white effect.

The oxime, used as starting material, is produced in an analogous manner to the oxime described in the latter part of Example 4, whereby 2-methyl-6-chlorobenzothiazole is used instead of 2-methylbenzothiazole.

EXAMPLE 6

Brightening of polyester during polycondensation

In a stainless-steel autoclave provided with stirrer, a gas-inlet tube, a vacuum arrangement, a descending condenser, a shut-off bottom nozzle, a charging valve and a heating-jacket, 388 g. of benzene-1,4-dicarboxylic acid dimethyl ester, 300 g. of 1,2-ethanediole and 0.4 g. of antimonous oxide are heated to 200° external temperature, whilst pure nitrogen is blown through, and maintained for 3 hours at this temperature. Methane thereby slowly distills off. With the exclusion of air, 0.4 g. of 2 - [4 - (3 - methyl - 4 - phenyl-v-triazole)-styryl]-5-methylbenzoxazole, dissolved in 40 g. of 1,2-ethanediole, are carefully charged into the autoclave, after the temperature has been allowed to fall to 190°. After the addition is completed, the temperature is raised within one hour to 285° external temperature, whereby 1,2-ethanediole distills off. Vacuum is then applied to the autoclave, the pressure slowly reduced to 0.2 torr and the condensation completed during 3 hours under these conditions. Vigorous stirring is maintained during this operation. The liquid condensation polymer is then extruded under nitrogen pressure through the bottom nozzle. Monofilaments are obtained which has a brilliantly white appearance.

EXAMPLE 7

Brightening of polyester fibres in the spinning solution 1000 parts of polyester granulate from polyterephthalic acid glycol ester are intimately mixed with 0.3 part of 2 - [4 - (3 - methyl-4-phenyl-v-triazoly)-styryl]-5-methyl-benzoxazole and, whilst being stirred, melted at 285°. After extrusion of the melt through normal spinning nozzles under a nitrogen pressure of 2–3 atm., greatly brightened polyester fibres are obtained. The thus obtained white effects have a good fastness to washing and light.

EXAMPLE 8

Brightening of polyamide fibres in the spinning solution 500 parts of polyamide shreds from δ-caprolactam, 1.5 parts of titanium dioxide (Anatas) and 0.25 part of 2-[4 - (3 - methyl-4-phenyl-v-triazolyl)-styryl]-5-methyl-benzoxazole are mixed for 10 hours in a rotary mixer. The mixture is then melted at 250–260° in a stainless-steel autoclave with the exclusion of air, extruded with nitrogen through a nozzle and stretched to the extent of 400%. A brightened white polyamide fibre is obtained having good fastness to light.

EXAMPLE 9

Brightening of polyamide during polymerization 400 parts of caprolactam, 40 parts of water, 0.4 part of the compound of the Example 1 and 1.6 parts of titanium dioxide (Anatas) are well mixed together and heated to ca. 70° until the mixture has liquified. The liquid mixture is transferred to a pressure vessel made from stainless-steel and heated within one hour, with the exclusion of oxygen, to a temperature of ca. 250°, whereby a pressure of 10–15 atm. is established. After this period of time, the water is distilled off and the polymeric mixture is subsequently held for 3 hours at 250°, with the absence of pressure, to obtain complete degassing. The mixture thereby assumes a viscosity which enables the polymerizate to be extruded in the form of filaments, under nitrogen pressure, through a nozzle located in the bottom of the pressure vessel. The solidified polyamide is separated, by extraction with water, from monomeric constituents. The polyamide fibre, obtained by this process, is characterized by a very high degree of whiteness. The brightening agent is fixed so that it is fast to washing and the polyamide fibres of improved appearance have good fastness to light.

EXAMPLE 10

Brightening of polypropylene fibres in the spinning solution 100 parts of polypropylene are homogenized with 0.5 part of titanium dioxide and 0.06 part of the brightener of the Example 1 in a kneading machine at 200°. The melt is extruded through spinning nozzles, by known methods, under inert gas of 2–3 atm. pressure and at a temperature of 280–300°. The thus obtained polypropylene threads are charaterized by a high degree of whiteness.

EXAMPLE 11

Brightening of polyamide using the exhaust process with acid

To 100 ml. of water are added 0.12 ml. of 85% formic acid and 0.06 g. of alkylpolyglycol ether ("Tinegal NA"). A solution is prepared from the optical brightener of the Example 1 by dissolving 1 g. thereof in 1000 ml. of glycol monoethyl ether. 3 ml. of this stock solution are added to the above described aqueous solution. This aqueous solution containing the brightener is heated to 60° and 3 g. of nylon staple fabric are introduced into the solution. The temperature is raised within 10–15 minutes to 90–92° and the fabric is left in the solution for 30 minutes at this temperature. The fabric is then rinsed and dried.

Compared with the untreated starting material, the thus treated fabric has a clearly whiter and more brilliant appearance.

EXAMPLE 12

Brightening of polyamide using the exhaust process, neutral

To 100 ml. of water are added 0.06 g. of alkylpolyglycol ether ("Tinegal NA"). A solution is prepared from the optical brightener of the Example 1 by dissolving 1 g. of the brightener in 1000 ml. of glycol monomethyl ether. 3 ml. of this stock solution are added to the above described aqueous solution. This aqueous solution containing the brightener is heated to 60° and 3 g. of nylon staple fabric are introduced into the solution. The temperature is raised within 10–15 minutes to 90–92° and the fabric is left in the solution for 30 minutes at this temperature. The fabric is then rinsed and dried.

Compared with the untreated starting material, the thus treated fabric has a clearly whiter and more brilliant appearance.

EXAMPLE 13

Brightening of polypropylene, e.g. "Meraklon"-fabric, using the exhaust process

To 1000 ml. of water are added 0.6 ml. of 4% acetic acid and 0.06 g. of alkylpolyglycol ether ("Tinegal NA"). A solution is prepared from the optical brightener of the Example 1 by dissolving 1 g. of the brightener in 1000 ml. of glycol monoethyl ester. 3 ml. of this stock solution are added to the above described aqueous solution. This aqueous solution containing the brightener is heated to 40° and 3 g. of "Meraklon"-fabric are introduced into the solution. The temperature is raised within 10–15 minutes to 95–98° and the fabric is left in the solution for 30 minutes at this temperature. The fabric is then rinsed and dried.

Compared with the untreated starting material, the thus treated fabric has a clearly whiter and more brilliant appearance.

EXAMPLE 14

Brightening of polyester using the HT-process

To 285 ml. of water are added 0.3 g. of alkylpolyglycol ether ("Tinegal NA") and 0.15 g. of trichlorobenzene as carrier ("Dilatin TC"). A solution is prepared from the optical brightener of the Example 1 by dissolving 1 g. of the brightener in 1000 ml. of glycol monoethyl ether. 15 ml. of this stock solution are added to the above described solution. This aqueous solution containing the brightener is heated to 20–30° and 15 g. of polyester fabric are introduced into the solution. The temperature is raised within 30 minutes to 130° and the fabric left in the solution for 30 minutes at this temperature. The temperature is then lowered within 15–20 minutes to 60°. The fabric is rinsed and dried.

Compared with the untreated starting material, the thus treated fabric has a clearly whiter and more brilliant appearance.

EXAMPLE 15

Brightening of polyester in the washing bath

To 100 ml. of water are added 0.4 g. of detergent of the following composition: dodecylbenzene sulphonate 16%, fatty alcohol sulphonate 4%, Na-tripolyphosphate 25%, tetra-sodium pyrophosphate 7%, Mg-silicate (MgSiO$_3$)

2%, Na-disilicate (Na$_2$(SiO$_3$)$_2$) 7%, carboxymethyl cellulose 1%, "Sequestren ST" 0.5%, sodium sulphate ca. 25%, water 2.5%. (Instead of sodium sulphate, the detergent can also contain 10–20% of Na-perborate or another agent containing oxygen.)

A solution is prepared from the optical brightener of the Example 1 by dissolving 1 g. of the brightener in 1000 ml. of ethylCellosolve. 0.8 ml. of this stock solution are added to the above described solution. This aqueous solution containing the brightener is heated to 55–60° and 3 g. of polyester fabric are introduced into the solution. The fabric is left for 20 minutes in the solution at this temperature. The fabric is then rinsed and dried.

The thus treated section of fabric has, after the treatment, a higher fluorescence number than before the treatment.

EXAMPLE 16

Brightening of polyamide in the washing bath

To 100 ml. of water are added 0.4 g. of detergent, as given in Example 15. A solution is prepared from the optical brightener of the Example 1 by dissolving 1 g. of the brightener in 1000 ml. of glycol monoethyl ether. 2 ml. of this stock solution are added to the above described aqueous solution. This aqueous solution containing the brightener is heated to 55–60° and 3 g. of polyamide fabric are then introduced into the solution. The fabric is left in the solution for 30 minutes at this temperature. The fabric is then rinsed and dried.

What we claim is:

1. A composition of matter comprising a spinning solution of polyamides, polyesters, or polyolefins and a compound of the Formula I:

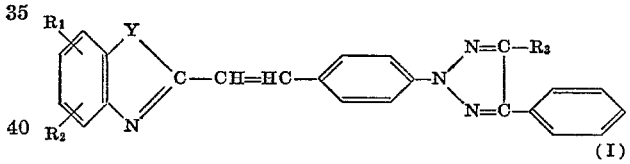

wherein

Y represents oxygen or sulfur, and

R$_1$ represents hydrogen, an alkyl group having from 1 to 4 carbon atoms, the phenyl group, a phenyl group substituted by alkyl having 1 to 4 carbon atoms, a phenyl group substituted by an alkoxy group having 1 to 2 carbon atoms, a phenyl group substituted by chlorine, an alkoxy group having 1 or 2 carbon atoms, an alkylsulfonyl group having 1 or 2 carbon atoms or chlorine.

R$_2$ represents hydrogen or an alkyl group having from 1 to 4 carbon atoms, and R$_3$ represents an alkyl group having 1 to 4 carbon atoms wherein the amount of the compound of the Formula I incorporated in the polyamides, polyesters or polyolefins is from 0.001% to 0.5% by weight.

References Cited

UNITED STATES PATENTS

| | | | |
|---|---|---|---|
| 2,875,089 | 2/1959 | Ackemann et al. | 117—33.5 T |
| 3,401,048 | 9/1968 | Okubo et al. | 117—33.5 T |
| 3,429,877 | 2/1969 | Maeder et al. | 117—33.5 T |
| 3,530,119 | 9/1970 | Schinzel et al. | 117—33.5 T |

WILLIAM D. MARTIN, Primary Examiner

T. G. DAVIS, Assistant Examiner

U.S. Cl. X.R.

117—33.5 T, 138.8 N, 138.8 F, 138.8 E